(12) United States Patent
Bantoft et al.

(10) Patent No.: US 10,353,838 B1
(45) Date of Patent: Jul. 16, 2019

(54) USB WIRELESS COCKPIT DATALOADER

(71) Applicant: Satcom Direct, Inc., Melbourne, FL (US)

(72) Inventors: Ken Bantoft, Oakville (CA); David Vandewalle, Melbourne Village, FL (US)

(73) Assignee: Satcom Direct, Inc., Melbourne, FL (US)

( * ) Notice: Subject to any disclaimer, the term of this patent is extended or adjusted under 35 U.S.C. 154(b) by 281 days.

(21) Appl. No.: 15/333,817

(22) Filed: Oct. 25, 2016

Related U.S. Application Data

(60) Provisional application No. 62/246,962, filed on Oct. 27, 2015.

(51) Int. Cl.
| | | |
|---|---|---|
| *G06F 13/12* | (2006.01) | |
| *G06F 13/38* | (2006.01) | |
| *G06F 13/42* | (2006.01) | |
| *H04L 12/40* | (2006.01) | |

(52) U.S. Cl.
CPC ........ *G06F 13/385* (2013.01); *G06F 13/4282* (2013.01); *H04L 12/4011* (2013.01); *H04L 12/40091* (2013.01)

(58) Field of Classification Search
CPC ................ G06F 3/18; G06F 7/04; G06F 7/02
USPC ............... 710/63, 305–306, 100; 701/32–33; 455/419
See application file for complete search history.

(56) References Cited

U.S. PATENT DOCUMENTS

| | | | |
|---|---|---|---|
| 6,671,589 B2 | 12/2003 | Holst | |
| 2015/0279126 A1* | 10/2015 | Schindler | ............. G08G 5/0013 701/3 |
| 2016/0083118 A1* | 3/2016 | Mahalingaiah | ....... B64F 5/0045 701/32.1 |

* cited by examiner

*Primary Examiner* — Tim T Vo
*Assistant Examiner* — Kim T Huynh
(74) *Attorney, Agent, or Firm* — Katten Muchin Rosenman LLP

(57) ABSTRACT

Methods and systems for allowing pilots and aircraft maintenance personnel to load data used by aircraft avionics (including but not limited to, Map Data, charts, XM Radio configuration data, LRU (line replaceable unit)/LRM (line replaceable module) specific configuration data or LRU/LRM software updates), wirelessly through the use of a USB to Wireless data bridge. The methods and systems can reduce and eliminate use of a USB (universal serial bus) hard drive or 'keys' be carried around with different collections of cockpit data.

20 Claims, 2 Drawing Sheets

USB WIRELESS COCKPIT DATALOADER

CROSS REFERENCE TO RELATED APPLICATIONS

This application claims the benefit of priority to U.S. Provisional Application Ser. No. 62/246,962 filed Oct. 27, 2015, the entire disclosure of which is incorporated herein by specific reference thereto.

FIELD OF INVENTION

This invention relates to aircraft avionics and aircraft communications, and in particular to methods and systems for allowing pilots and/or aircraft maintenance personnel to load data used by aircraft avionics (including but not limited to, Map Data, charts, XM Radio configuration data, LRU (line replaceable unit)/LRM (line replaceable module) specific configuration data or LRU/LRM software updates), wirelessly through the use of a USB (universal serial bus) to Wireless data bridge.

BACKGROUND AND PRIOR ART

Many cockpits currently accept data via USB (Universal Serial Bus) interfaces. However, typically in these systems the data must be loaded on a USB flash drive or 'key'.

U.S. Pat. No. 6,671,589 to Hoist et al., which is incorporated by reference in its' entirety, describes a method and apparatus to support remote and automatically initiated data loading and data acquisition of airborne computers using a wireless spread spectrum aircraft data services link. The SanDisk Wireless flash drive is not suitable for use in loading avionics for several reasons.

First, The SanDisk Wireless flash drive does not emulate a USB Mass Storage Device that is compatible with avionics. Second, The SanDisk Wireless flash drive does not support automatic updates. Third, The SanDisk Wireless flash drive utilizes local non-volatile storage which allows for the possibility of stale data to be loaded into the cockpit systems. Fourth The SanDisk Wireless flash drive only supports Access Point (AP) WiFi radio mode, which severely limits it's utility and security when interoperating with legacy avionics systems. Fifth, The SanDisk Wireless flash drive only supports data update access via iOS and Android platform applications or Hypertext Transport Protocol (HTTP). Direct updates from other avionics LRUs (line replaceable units) or other vendor PC (personal computer) mor mobile applications is not supported.

Thus, the need exists for solutions to the above problems with the prior art.

SUMMARY OF THE INVENTION

A primary objective of the present invention is to provide methods and systems for allowing pilots and aircraft maintenance personnel to load data used by aircraft avionics (including but not limited to, Map Data, charts, XM Radio configuration data, LRU (line replaceable unit)/LRM (line replaceable module) specific configuration data or LRU/LRM software updates), wirelessly through the use of a USB (universal serial bus) to Wireless data bridge.

A secondary objective of the present invention is to provide methods and systems with allows the use of a USB to Wireless bridge, whereby the data files are stored on another LRU, or at the aircraft hanger or other remote location, and can be directly loaded into the cockpit data loader wirelessly.

A third objective of the present invention is to provide methods and systems for loading avionics data from a remote server to an database loader onboard an aircraft via a USB (universal serial bus) which eliminates use of a USB hard drive or 'keys' be carried around with different collections of cockpit data.

A system for loading cockpit data in an aircraft wirelessly from another location or system, can include or consist of a wireless radio connected to a data server, the data server for storing cockpit avionics data, a USB (universal serial bus) wireless gateway device for providing a wireless gateway for receiving the cockpit avionics data from the wireless radio to transmit over a wireless network, a USB (universal serial bus) interface in the aircraft, and an aircraft database loader in the aircraft attached to the USB interface, wherein the aircraft requests the cockpit avionics data from the data server, and the system converts individual USB mass storage class SCSI (small Computer System Interface) commands to equivalent network data server requests, allowing a centralized location of the data, and eliminates use of a USB hard drive or 'keys' be carried around with different collections of cockpit data.

The cockpit avionics data can include information selected from at least one of Map Data, charts, and XM Radio configuration data, LRU (line replaceable unit)/LRM (line replaceable module) specific configuration data and LRU/LRM software updates.

The data server can be remotely located on another aircraft LRU (line replaceable unit).

The server can be remotely located on a ground based server, such as in a hanger.

The ground based server can be maintained on a portable computer, the computer selected from at least one of a laptop, tablet and other mobile device.

The wireless network can include a predefined set of 802.11 wireless networks.

The wireless network can include cellular wireless networks.

The USB wireless gateway device can include a computer/controller for processing USB bus requests and translating the requests to wireless data transfer requests.

The USB interface can operate as a USB Mass Storage Class device to the aircraft data loader.

A method for loading cockpit data in an aircraft wirelessly from another location can include or consist of the steps of connecting a wireless radio to a data server, the data server for storing cockpit avionics data, providing a USB (universal serial bus) wireless gateway device as a wireless gateway for receiving the cockpit avionics data from the wireless radio to transmit over a wireless network, providing a USB (universal serial bus) interface in the aircraft, providing an aircraft database loader in the aircraft attached to the USB interface, and requesting the cockpit avionics data in the data server from the aircraft database loader, wherein the method converts individual USB mass storage class SCSI commands to equivalent network data server requests, allowing a centralized location of the data, and eliminates use of a USB hard drive or 'keys' be carried around with different collections of cockpit data.

The cockpit avionics data can include information selected from at least one of Map Data, charts, and XM Radio configuration data, LRU (line replaceable unit)/LRM (line replaceable module) specific configuration data and LRU/LRM software updates.

The method can include the step of remotely locating the data server is remotely on another aircraft LRU (line replaceable unit).

The method can include the step of remotely locating the server on a ground based server.

The method can include the step of remotely locating the ground based server in a hanger.

The method can include the step of maintaining the ground based server on a portable computer, the computer selected from at least one of a laptop, tablet and other mobile device.

The method can include the step of providing a predefined set of 802.11 wireless networks as the wireless network.

The method can include the step of providing cellular wireless networks as the wireless network.

The method can include the step of providing a computer/controller for processing USB bus requests and translating the requests to wireless data transfer requests, as the USB wireless gateway device.

The method can include the step of operating the USB interface as a USB Mass Storage Class device to the aircraft data loader.

Further objects and advantages of this invention will be apparent from the following detailed description of the presently preferred embodiments which are illustrated schematically in the accompanying drawings.

DESCRIPTION OF THE PREFERRED EMBODIMENTS

Figure 1:
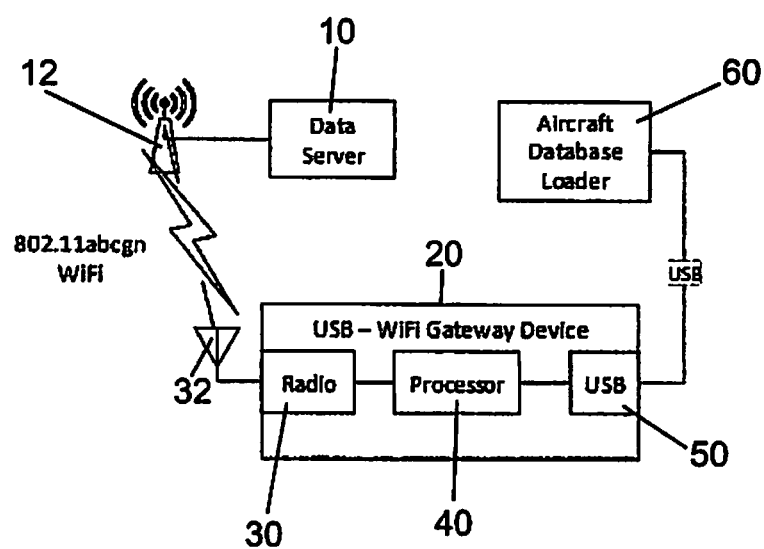
FIG. 1 shows a schematic of a preferred embodiment of the invention.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components and terms will now be described.

10 Data server located on another aircraft LRU (line replaceable unit) or resident in a ground based computing device.

12 Antenna such as but not limited to an external monopole WiFi antenna or device internal WiFi antenna.

20 USB (universal serial bus) WiFi Gateway Device w/radio 30, processor

40 USB 50 which is attached to the USB port of the Aircraft Database Loader.

32 Antenna such as but not limited to an external monopole, internal ceramic or internal PCB trace (copper wire laid out on a PCB, which acts as an antenna) WiFi antenna.

30 radio, such as but not limited to a discrete chip set based, modular solder down, or USB WiFi or cellular radio 40 processor, such as but not limited to a System-On-Chip type MCU (microcontroller unit), and be a cpu (central processing unit)/controller.

50 Host USB (universal serial bus) interface and connector 60 onboard aircraft database loader, with USB interface onboard an aircraft, such as but not limited to a Rockwell Collins DBU (Database Updater) or Honeywell DMU (Data Management Unit)

802.11 wireless network is a set of media access control (MAC) and physical layer (PHY) specifications for implementing wireless local area network (WLAN) computer communication in the 2.4, 3.6, 5, and 60 GHz frequency bands.

Cellular network communication would include the approximately 700 to approximately 2100 mhz frequency bands, using GSM, 3GPP, LTE technologies, which includes approximately 900 MHz.

CPU/controller is a central processing unit.

As previously described, this invention is an improvement on U.S. Pat. No. 6,671,589 to Holst et al., which is incorporated by reference in its' entirety, describes a method and apparatus to support remote and automatically initiated data loading and data acquisition of airborne computers using a wireless spread spectrum aircraft data services link.

This invention allows the use of a USB (universal serial bus) to Wireless bridge, whereby the data files are stored on another LRU or LRM, or at the aircraft hanger or other remote location, and can be directly loaded into the cockpit data loader wirelessly.

LRU refers to a Line Replaceable Unit.

LRM refers to a Line Replaceable Module

Data used by aircraft avionics includes but is not limited to, Map Data, charts, XM Radio configuration data, LRU/LRM specific configuration data or LRU/LRM software updates FIG. 1 shows a schematic of a preferred embodiment of the invention, which allows cockpit data to be loaded wirelessly from another aircraft LRU, or from a ground based system. The invention comprises:

A wireless radio, capable of connecting to a predefined set of 802.11 wireless networks A CPU/controller, which processes USB bus requests and translates them to wireless data transfer requests A USB interface, which presents itself as a USB Mass Storage Class device to the cockpit dataloader A server component, running on either another aircraft LRU, or a ground based server (ie: at a hanger on a maintainer laptop or tablet device or other PC (personal computer) or other device), which stores the actual data files and services the wireless data requests In essence, the invention converts individual USB mass storage class SCSI commands to equivalent network data server requests, allowing centralized location of the data, and reducing the need for USB hard drive or 'keys' be carried around with different collections of cockpit data.

Referring to FIG. 1, the use of the invention is initiated by the attachment of the USB-WiFi Gateway Device 20 FIG. 1 to the avionics LRU/LRM via the Host USB connector 50 FIG. 1. Attachment to the host LRU/LRM supplies the invention with power, which causes the Processor 40 FIG. 1 to begin execution of its resident software and attach to the configured wireless network via the Radio 30 FIG. 1.

Subsequently, the Data Server 10 FIG. 1 can detect the presence of the USB-WiFi Gateway Device 20 FIG. 1 on the configured wireless network via it's antenna 32 and WiFi radio 30 FIG. 1 and initiates a network connection, such as but not limited to a TCP (Transmission Control Protocol) connection, to the invention. The successful setup of this connection and subsequent exchange of configuration data between the USB-WiFi Gateway Device 20 FIG. 1 and Data Server 10 FIG. 1 concludes the attachment phase of the invention.

After attachment the invention can operate on a transactional basis, a transaction can be initiated by the reception of a USB Mass Storage SCSI (Small Computer System Interface) request generated by the LRU/LRM the invention is attached to at the Host USB connector and interface 20 FIG. 1. The Processor 40 FIG. 1 can decode the USB Mass Storage command and extracts the SCSI request contained within it.

If the SCSI request is a supported type, the Processor 40 FIG. 1 can convert it to an equivalent network request and relays it to the Data Server 10 FIG. 1, via the network connection established during attachment. The data server can process the request and returns the results via the network connection.

When the results are received via the Radio 30 FIG. 1 the Processor 40 can decode the results, and translates them into an equivalent USB Mass Storage SCSI response, and sends them to the host LRU/LRM 60 via the Host USB connection 50 FIG. 1. This concludes the transaction, at which point the invention is now prepared to service another transaction.

Extraction of the USB-WiFi Gateway Device (FIG. 1, 20) from the host LRU/LRM can result in loss of power to the Radio and Processor, which results in the eventually detection of network connection loss by the Data Server 10. Once the Data Server 10 terminates its side of the network connection, the entire system can be returned to its starting state and is ready for the next use of the invention in a host LRU/LRM.

Figure 2:
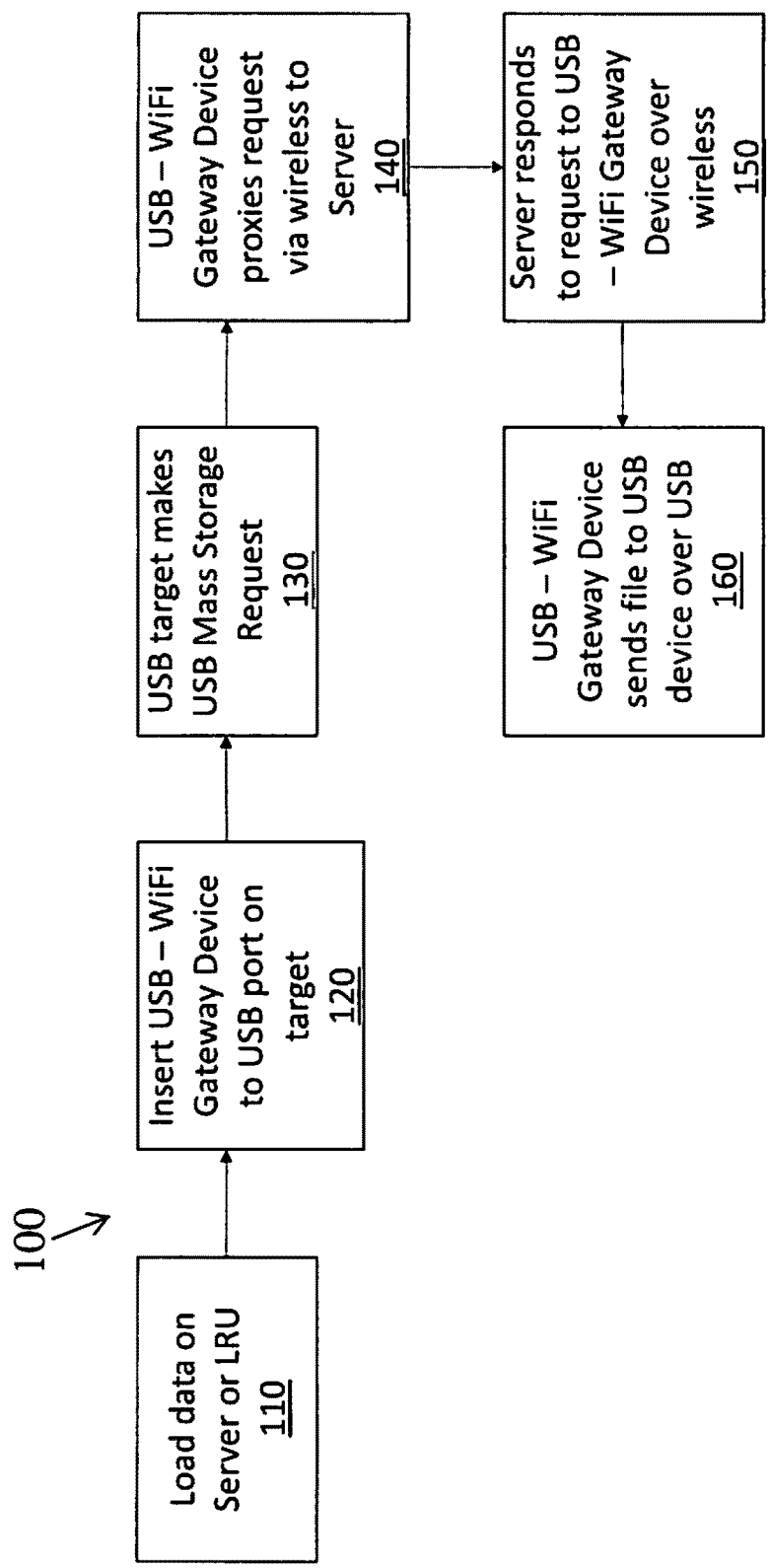
FIG. 2 is a flowchart of the steps for loading avionics data from a remote server to a database loader onboard an aircraft with a USB (universal serial bus) with the invention.

FIG. 2 is a flowchart 100 of the 6 steps 110, 120, 130, 140, 150, 160 for loading avionics data from a remote server to a database loader onboard an aircraft with a USB (universal serial bus) with the invention. Step 110 is to load data on Server or LRU. Step 120 is to insert the USB-WiFi Gateway Device to USB port on target. Step 130 covers the USB target makes a USB Mass Storage Request. Step 140 has the USB-WiFi Gateway Device proxies request via wireless to Server. Step 150 has the Server responds to request to USB-WiFi Gateway Device over wireless. Step 160 has the USB-WiFi Gateway Device sends file to USB device over USB.

Beyond its utility within the aviation field the invention can also be broadly useful for general purpose wireless USB emulation with centralized data storage such as but not limited to that which is frequently required in an avionics lab or data center environment.

A datacenter environment can use this invention to allow loading of configuration or software updates to a computer or network appliance device from another server or remote location.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A system for loading cockpit data in an aircraft wirelessly from another location or system, comprising:
   a wireless radio connected to a data server, the data server for storing cockpit avionics data;
   a USB (universal serial bus) wireless gateway device for providing a wireless gateway for receiving the cockpit avionics data from the wireless radio to transmit over a wireless network;
   a USB interface in the aircraft; and
   an aircraft database loader in the aircraft attached to the USB interface, wherein the USB wireless gateway device receives USB mass storage class SCSI (small Computer System Interface) commands from the aircraft for requesting of and retrieving from the data server the cockpit avionics data, and the USB wireless gateway device converts the received individual USB mass storage class SCSI commands to equivalent network data server requests, allowing a centralized location of the data and eliminating a need to use or carry a USB hard drive or 'keys' with different collections of cockpit data.

2. The system of claim 1, wherein the cockpit avionics data includes information selected from at least one of Map Data, charts, and XM Radio configuration data, LRU (line replaceable unit)/LRM (line replaceable module) specific configuration data and LRU/LRM software updates.

3. The system of claim 1, wherein the data server is remotely located on another aircraft LRU (line replaceable unit).

4. The system of claim 1, wherein the server is remotely located on a ground based server.

5. The system of claim 4, wherein the ground based server is located in a hanger.

6. The system of claim 4, wherein the ground based server is maintained on a portable computer, the computer selected from at least one of a laptop, tablet and other mobile device.

7. The system of claim 1, wherein the wireless network includes: a predefined set of 802.11 wireless networks.

8. The system of claim 1, wherein the wireless network includes cellular wireless networks.

9. The system of claim 1, wherein the USB wireless gateway device includes:
   a computer/controller for processing USB bus requests and translating the requests to wireless data transfer requests.

10. The system of claim 1, wherein the USB interface operates as a USB Mass Storage Class device to the aircraft data loader.

11. A method for loading cockpit data in an aircraft wirelessly from another location comprising the steps of:
   connecting a wireless radio to a data server, the data server for storing cockpit avionics data;

providing a USB (universal serial bus) wireless gateway device as a wireless gateway for receiving the cockpit avionics data from the wireless radio to transmit over a wireless network;

providing a USB interface in the aircraft;

providing an aircraft database loader in the aircraft attached to the USB interface;

receiving USB mass storage class SCSI commands from the aircraft; and requesting of and retrieving from the data server the cockpit avionics data, wherein the USB wireless gateway device converts the received individual USB mass storage class SCSI commands to equivalent network data server requests, allowing a centralized location of the data and eliminating a need to use or carry a USB hard drive or 'keys' with different collections of cockpit data.

12. The method of claim 11, wherein the cockpit avionics data includes information selected from at least one of Map Data, charts, and XM Radio configuration data, LRU (line replaceable unit)/LRM (line replaceable module) specific configuration data and LRU/LRM software updates.

13. The method of claim 11, further comprising the step of:

remotely locating the data server is remotely on another aircraft LRU (line replaceable unit).

14. The method of claim 11, further comprising the step of:

remotely locating the server on a ground based server.

15. The method of claim 14, wherein the step of remotely locating the server includes the step of:

remotely locating the ground based server in a hanger.

16. The method of claim 14, further comprising the step of:

maintaining the ground based server on a portable computer, the computer selected from at least one of a laptop, tablet and other mobile device.

17. The method of claim 11, further comprising the step of:

providing a predefined set of 802.11 wireless networks as the wireless network.

18. The method of claim 11, further comprising the step of:

providing cellular wireless networks as the wireless network.

19. The method of claim 11, further comprising the step of:

providing a computer/controller for processing USB bus requests and translating the requests to wireless data transfer requests, as the USB wireless gateway device.

20. The method of claim 11, further comprising the step of:

operating the USB interface as a USB Mass Storage Class device to the aircraft data loader.

* * * * *